United States Patent [19]

Harr

[11] E Patent Number: Re. 32,113

[45] Reissued Date of Patent: Apr. 15, 1986

[54] AIR CONDITIONED LABORATORY RACK FOR ANIMAL CAGES

[75] Inventor: James R. Harr, Rochester, N.Y.

[73] Assignee: Thoren Caging Systems, Inc., Hazleton, Pa.

[21] Appl. No.: 354,666

[22] Filed: Mar. 4, 1982

Related U.S. Patent Documents

Reissue of:

[64] Patent No.: 4,249,482
Issued: Feb. 10, 1981
Appl. No.: 58,142
Filed: Jul. 17, 1979

[51] Int. Cl.[4] ..... A01K 1/02

[52] U.S. Cl. ..... 119/15; 119/20

[58] Field of Search ..... 119/15, 17, 18, 21; 98/31-33 R, 33 A, 40 C, 40 D; 34/195, 196; 312/236; 62/261, 440; 99/475

[56] References Cited

U.S. PATENT DOCUMENTS

| | | | |
|---|---|---|---|
| 1,622,664 | 3/1927 | Murray et al. | 98/31 |
| 1,814,979 | 7/1931 | Taylor | 98/31 |
| 2,060,065 | 11/1936 | Gill | 34/197 |
| 2,566,453 | 9/1951 | Ketary | 98/31 |
| 3,261,650 | 7/1966 | Stromquist | 34/196 |
| 3,381,663 | 5/1968 | Dayton | 119/15 |
| 3,415,024 | 12/1968 | Kottarz | 98/31 |
| 3,537,428 | 11/1970 | Montgomery | 119/18 |
| 3,557,756 | 1/1971 | Ramsey | 119/15 |
| 3,630,174 | 12/1971 | Runkle | 119/45 |
| 3,826,229 | 7/1974 | Classe et al. | 119/17 |
| 3,924,571 | 12/1975 | Holman | 119/15 |
| 3,924,572 | 12/1975 | Classe et al. | 119/17 |
| 3,990,398 | 11/1976 | Davis, Jr. | 119/17 |
| 4,085,705 | 4/1978 | Gland et al. | 119/17 |
| 4,126,775 | 11/1978 | Wyatt | 34/196 |
| 4,143,588 | 3/1979 | Exler | 98/33 A |
| 4,189,196 | 2/1980 | Baker et al. | 312/236 |
| 4,206,720 | 6/1980 | Ruggeri et al. | 119/17 |

FOREIGN PATENT DOCUMENTS

| | | | |
|---|---|---|---|
| 1308817 | 3/1972 | United Kingdom | 119/15 |

OTHER PUBLICATIONS

Individual Isolation of Infected Animals in a Single Room, Horsfall, Jr. and Bauer, Journal of Bacteriology, vol. 40, 1940, pp. 570-580.

Housing and Stress, Riley and Spackman, Lab Animal, 1977, pp. 16, 18-21.

(List continued on next page.)

*Primary Examiner*—Hugh R. Chamblee
*Attorney, Agent, or Firm*—Steele, Gould & Fried

[57] ABSTRACT

The rack comprises a plurality of hollow, sheet metal shelves supported in spaced, horizontal planes by four tubular corner posts. Two rows of animal cages of generally box-like configuration are removably suspended beneath each shelf, with the upper, open end of each cage disposed in near sealing engagement with the underside of the shelf from which it is suspended. Each shelf is divided into three compartments which extend between opposite ends of the rack. The middle compartment of each shelf overlies adjacent portions of the cages in each of the two rows suspended therebeneath, and has in its bottom a plurality of spaced openings so that each cage is in communication at its upper end with the middle compartment. The two outer compartments of each shelf overlie, respectively, the remaining portions of the cages in the two rows thereof, and also have in their lower sides spaced openings which communicate with the interiors of the cages positioned therebeneath. Filtered air from a supply plenum on top of the rack is blown by a recirculating fan downwardly through the posts at one end of the rack, through tubular fittings into the outer compartments of the shelves, and through the openings in the bottoms of these compartments into the cages therebeneath. The center compartment of each shelf is connected through the posts at the opposite end of the rack to the inlet of the fan, so that air fed to the cages is exhausted through the bottoms of the center compartments, and is passed by the fan through filters on top of the rack and back to the supply plenum for recirculation through the cages.

19 Claims, 6 Drawing Figures

OTHER PUBLICATIONS

Abstracts 22A, 23–25 of papers presented at 23rd Annual Session of American Association for Laboratory Animal Science, 1972.

Sales brochure of Lab Products, Inc. 1976 (four pages).

Ventilated Cages for Mice, Edwin P. Les, 39th annual report to Jackson Laboratory, 1967, p. 111.

Ventilated Cages for Mice, E. P. Les, abstract of paper presented at 19th annual meeting of American Association for Laboratory Animal Science, 1968.

Individually Ventilated Cages for Mice, E. P. Les, 44th annual report to Jackson Laboratory, 1972, p. 107.

Saving Space with Individual Cage Ventilation for Mice, E. P. Les, 46th annual report to the Jackson Laboratory, 1974, p. 106.

Saving Space with Individual Cage Ventilation for Mice, E. P. Les, abstract of paper presented to American Association for Laboratory Animal Science, 26th annual session, 1975.

Evaluation of Pressurized Individually Ventilated Mouse Cages, E. P. Les, 47th annual report to Jackson Laboratory, 1975, pp. 106, 107.

Pressurized, Individually Ventilated and Individually Exhausted Caging, E. P. Les, 48th annual report to Jackson Laboratory, 1976–77, p. 119.

Improving the Microenvironment of Mouse Cages, E. P. Les, title of presentation at 1976 symposium "Rodents in Research", American Association of Laboratory Animal Science.

Pressurized, Individually Ventilated Caging and its Effect on The Reproduction of A–J and DBA–2J Mice, E. P. Les, abstract of paper presented to American Association for Laboratory Animal Science, 28th session, 1977.

AIR CONDITIONED LABORATORY RACK FOR ANIMAL CAGES

Matter enclosed in heavy brackets [ ] appears in the original patent but forms no part of this reissue specification; matter printed in italics indicates the additions made by reissue.

This invention relates to animal cages or housings, more particularly to an improved rack or stand which is particularly suited for housing or caging a plurality of animals in laboratory surroundings, or the like.

There are currently available several varieties of animal cages which are employed for housing small animals that are to be used in laboratories for experimental work, and the like. Certain cages of the variety that are adapted to be suspended usually are made with open tops, wire fronts and bottoms, and metal backs and sides. These cages are usually suspended in a room which is ventilated so that the animals in the cages draw air from the room, and exhaust gases into the room. Droplets, waste particles and gases are free to pass between the cages, the animals, and the (human) staff.

A primary disadvantage of this caging system is that there is no physical barrier between the cages to prevent transfer of waste and gases therebetween; and moreover, the room itself is suitable for use only as long as the ventilation apparatus functions properly. Usual ventilation recommended for this system produces fifteen to eighteen room changes per hour, which is approximately four to five times as rapid as that which occurs in an average office. Minimum air moved through the room per single cage is normally two to three cubic feet per minute (cfm) with this system.

In the case of another type of caging system a so-called shoe-box type of cage comprises a plastic box mounted on a steel shelf or base. Each box has a wire lid of stainless steel. Several such boxes are mounted in a room which, as in the case of the suspended-type cage, must be ventilated carefully, and as a consequence has disadvantages similar to the suspended-type cage system. Although it is possible to interpose a filter between the cage and its wire lid, the filter caps restrict ventilation in the cage, the interior of which therefore tends to become undesirably warm and humid. As in the case of the suspended cages, air movement relative to each cage of the shoe-box variety normally is in the vicinity of two to three cfm. Although larger droplets and particles are prevented from leaving and/or entering a particular cage, there nevertheless is, as a practical matter, no physical barrier between the cages.

Efforts have been made to improve on these basic cages by utilizing a large air blower, which is housed in a mobile, free-standing unit that is adapted to be fastened to the side of a traditional rack of the type from which a series of cages are suspended, or upon which such cages are mounted. A filter can be employed in conjunction with the blower to provide a laminar flow of filtered air across and through a cage rack from side to side, or rear to front of the cages. The disadvantage of this unit is that the amount of square footage of floor space required per cage is increased by fifty percent. Moreover, the cages interrupt the laminar flow of air and cause eddies in the air currents that carry particles between cages, the animals therein, and the working staff. Again, there is no physical boundary between cages. Moreover, the used air spills into the room and is sucked back into the laminar flow apparatus.

It is an object of this invention to provide an improved caging system of the type described which will provide a separate or isolated air flow path for each animal cage in the system.

Another object of this invention is to provide an improved caging system of the type described in which there is a careful balance or control between the ratio of intake and exhaust air circulated through the cages of the system.

Still another object of this invention is to provide an improved caging system of the type described in which filtered air is circulated in closed paths between an air supply plenum, and an exhaust plenum which communicates through a filter system with the air supply plenum.

Another object of this invention is to provide an improved caging system of the type described which is extremely compact and efficient as compared to prior such systems.

An additional object of this invention is to provide an improved animal caging system of the type described which isolates or separates each animal in the system one from the other, and conserves or minimizes the utility costs and the floor space required for the system.

It is an object also for this invention to provide a novel storage rack for housing a plurality of animal cages in a self-contained, air-conditioned ambient, so that each cage receives a balanced supply of fresh or filtered air from a source which is substantially isolated from the air in the room in which the rack is located.

A further object of this invention is to provide a novel storage rack of the type described which is sturdy, mobile, and relatively inexpensive to manufacture.

Other objects of the invention will be apparent hereinafter from the specification and from the recital of the appended claims, particularly when read in conjunction with the accompanying drawings.

Figure 1:
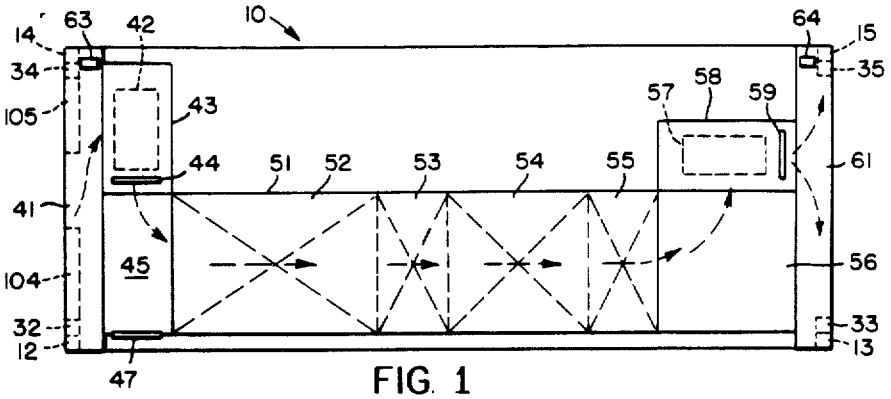
FIG. 1 is a plan view of a mobile animal caging rack made according to one embodiment of this invention.

Referring now to the drawings by numerals of reference, and first to FIGS. 1 to 3, 10 denotes generally a mobile animal caging rack which is generally rectangular in configuration, and which comprises four, rectangular tubular corner posts 12, 13, 14 and 15. Each of these posts has on its lower end a conventional caster 18 which enables the rack 10 to be moved with ease about the floor of a laboratory or the like. Supported between these posts in equi-spaced horizontal planes are six shelves 21, 22, 23, 24, 25 and 26. At least shelves 21–25 are hollow; and as noted in greater detail hereinafter, the two posts 13 and 15 at one end of the rack, together with adjacent ducts 33 and 35, are designed to convey fresh or filtered air to the hollow shelves 21 through 25, while the two posts 12 and 13 of the opposite end of the rack, as supplemented by ducts 32 and 34, are designed to function as exhaust ducts which withdraw air from the shelves for recirculation through a filter system described hereinafter.

Better to control the flow of air through the shelves 21 to 25, the additional ducts 32, 33, 34 and 35, which also are rectangular in cross section, are mounted at each of the four corners of the rack in side by side relation to the upper ends of the posts 12, 13, 14 and 15, respectively. Each of these supplemental ducts 32–35 is connected, as noted hereinafter, only to the three uppermost shelves 21, 22 and 23 in the rack, and therefore each extends from the upper end of its associated corner post 12, 13, 14 or 15 downwardly to a point adjacent to the third shelf 23, where it is terminated as noted hereinafter.

Each of the ducts 12, 14, 32 and 34 communicates at its upper end with the interior of a large, generally rectangular exhaust plenum 41 (FIGS. 1 and 2) which extends transversely across the top of rack 10, and in overlapping relation to a portion of the shelf 21. The interior of plenum 41 communicates with the inlet of an exhaust blower 42, which is mounted adjacent the plenum in a housing 43. As shown by the arrows and broken lines in FIGS. 1 and 2, the air from plenum 41 enters the inlet to blower 42, and is discharged through an adjustable damper 44 onto a filter inlet plenum 45. The damper 44 is mounted in housing 43 for adjustment transversely of the outlet of blower 42, so as to enable one to control the rate of discharge of air into the filter inlet plenum. Plenum 45 may also have in its end remote from the blower 42 an opening over which a manually operable damper 47 can be mounted in conjunction with a conventional coupling member (not illustrated), so as to enable fresh air, or air from another source, to be admitted through the damper 47 to plenum 45, if it desired to supplement the air discharged from blower 42.

Figure 2:
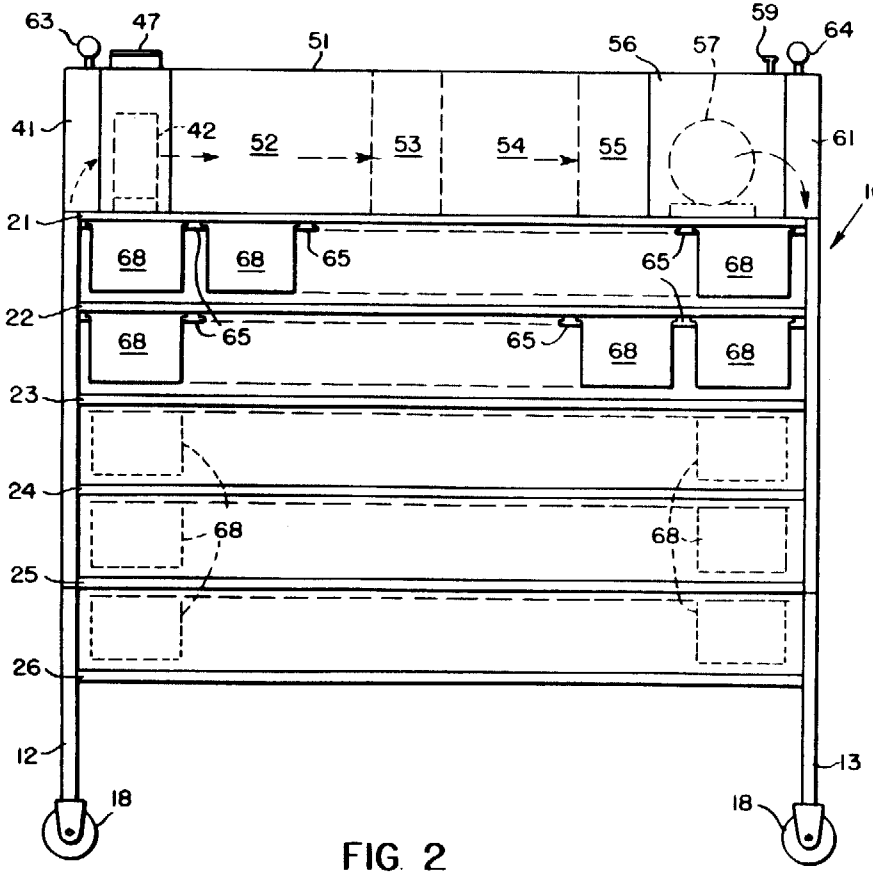
FIG. 2 is a front elevational view of this rack, with certain of the cages shown in phantom by broken lines.

The inlet plenum 45 exhausts into one end of an elongate filter housing 51, which is divided into four successive filter sections denoted schematically in FIGS. 1 and 2 by the numerals 52, 53, 54 and 55. The first section 52 contains a plurality of layers of filter material of progressively increasing density, so as to remove hair, dust and small particles from the air that travels through the filter. The second section 53 contains, for example, a pleated 98% filter; section 54 may contain a membrane filter; and the final section may contain a column of charcoal to remove any gaseous impurities remaining in the air. After passing through the filter housing 51 the air enters a plenum 56, which communicates with the intake side of a further blower 57 which is mounted in a housing 58 adjacent the right end (FIG. 1) of rack 10. The exhaust side of the blower 58 communicates through an adjustable damper 59 with a filtered air supply plenum 61, which extends transversely between the sides of rack 10, and across the upper ends of the supply ducts 13, 15, 33 and 35.

Figure 3:
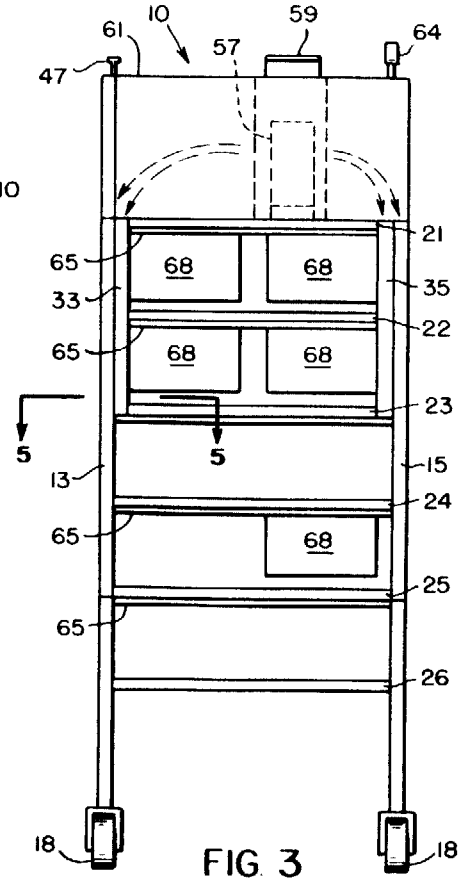
FIG. 3 is an end elevational view of this rack, as seen when looking toward the left end of the rack as shown in FIG. 2.

In FIGS. 1 to 3, numerals 63 and 64 denote conventional pressure gages which are connected to the interiors of plenums 41 and 61, respectively, to monitor the pressure of the air therein.

Secured to the underside of each shelf 21, 22, 23, 24 and 25 is a plurality of spaced parallel cage supporting brackets 65, which extend transversely between opposite sides of the rack 10. As shown more clearly in FIG. 4, each bracket 65 is generally inverted. T-shaped in cross section, whereby an elongate, laterally projecting lip or flange portions 66 is formed along each longitudinal side edge thereof in spaced relation to the underside of the associated shelf 21, 22, 23, 24 or 25. Removably supported from the underside of each of the shelves 21 to 25 by the brackets 65 is a plurality of identically shaped animal cages 68, some of which are shown by phantom in broken lines in FIG. 2. As shown more clearly in FIG. 4, each cage 68 is in the form of a rectangular, transparent, plastic container having an open upper end surrounded by a laterally projecting, peripheral flange 69. Opposed portions of each flange 69 are slidable in the narrow spaces formed between the underside of a shelf (see shelf 25 in FIG. 4) and the confronting edges of the flanges 66 of adjacent brackets 65, whereby each cage 68 is supported by an associated pair of brackets 65 slightly beneath the underside of the shelf from which it is suspended. Consequently, an almost negligable air gap or space exists between the underside of the associated shelf and the upper, open end of the cage, as denoted by the numeral 70 in FIGS. 4 and 6. Also, as shown more clearly in FIG. 3, each cage 68 is slightly less in length than one half the width of the rack 10, so that two cages 68 can be supported between an adjacent pair of brackets 65, each cage being insertable into, or removable from, either side of the rack.

Figure 4:
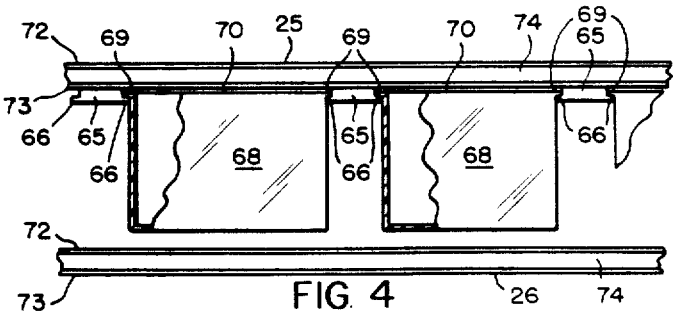
FIG. 4 is an enlarged, fragmentary front elevational view similar to FIG. 2 but showing in greater detail a pair of adjacent cages as they appear when suspended in the rack, portions of each cage being broken away and illustrated in section.
Figure 5:
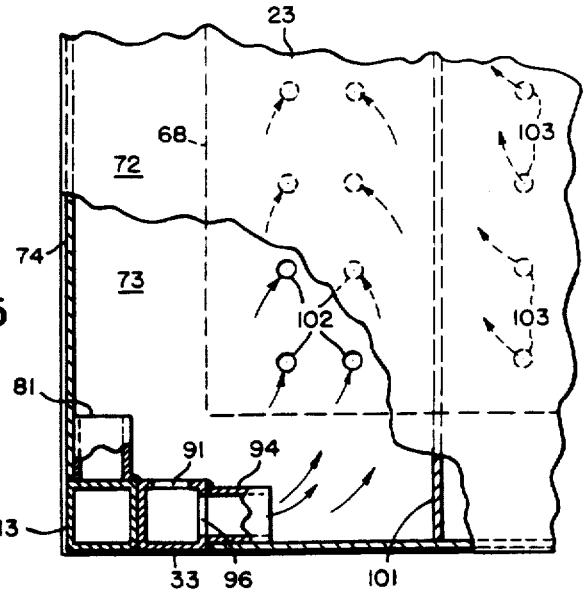
FIG. 5 is a greatly enlarged, fragmentary sectional view taken along the line 5—5 in FIG. 3 looking in the direction of the arrows.
Figure 6:
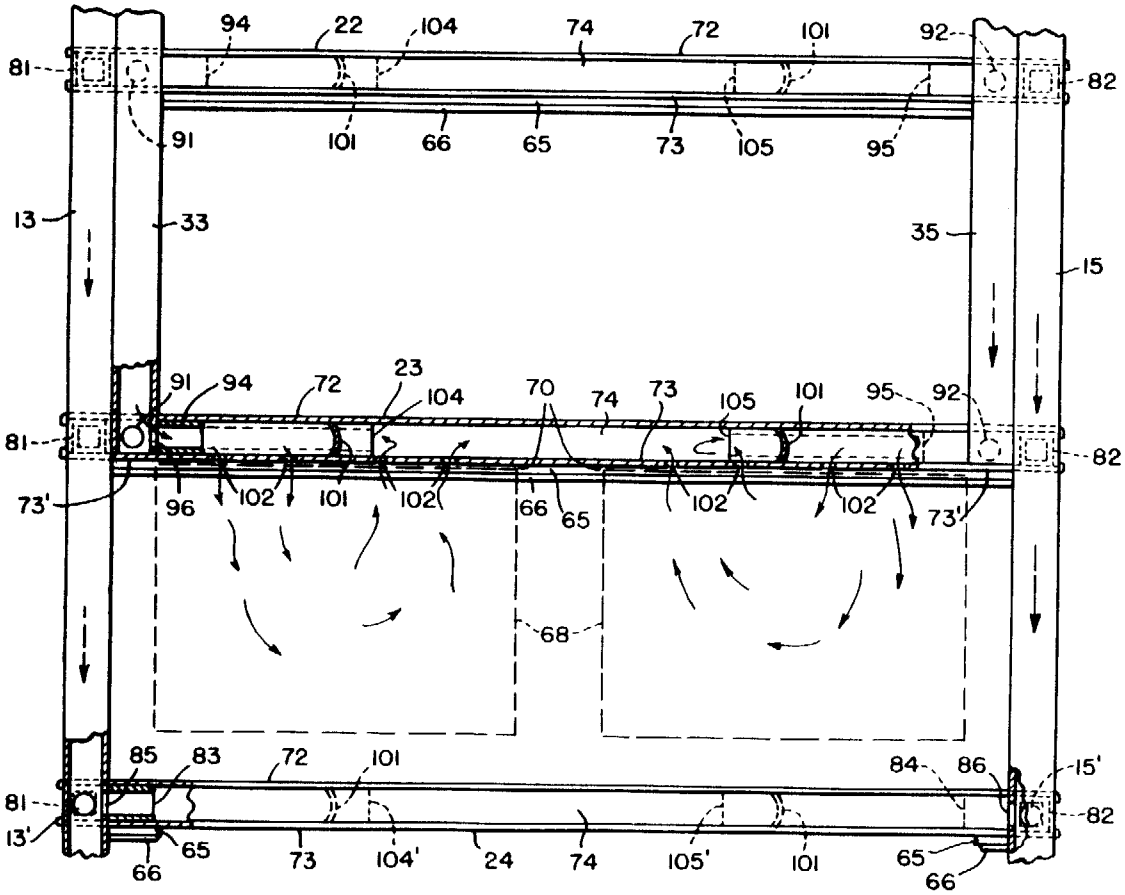
FIG. 6 is a fragmentary end elevational view similar to FIG. 3, but on a greatly enlarged scale, and with portions of the rack broken away and shown in section for purposes of illustration.

Referring now to FIGS. 4 to 6, each shelf 21–26 comprises two vertically spaced rectangular sheets 72 and 73 of stainless steel, each of which is approximately 1/16" thick (for example sixteen gage). Each of the hollow shelves 21–25 is sealed around its edges by a vertically disposed, elongate strip portion 74 of stainless steel, or the like. One of the sheets 72 or 73 for a given shelf may be larger than the other, and may have a marginal portion around its edge folded downwardly or upwardly, at right angles to the major portion of the sheet in order to form the upstanding, vertical strip portion 74 which is necessary for sealing the spaced sheets around their edges. The edge of this marginal portion 74 is folded over and crimped into engagement with the registering peripheral edges of the associated shelving sheet 72 or 73. This crimping operation can be performed in a manner similar to that in which overlapping edges of sheetmetal ductwork, or the like, are folded and crimped to one another to form an air-tight seal between the joined sheets. Alternatively, of course, the strips 74 could be separate members with their edges crimped to the registering edges of the associated shelving sheet 72 and 73.

It is to be understood that shelf 26 may be fabricated in a similar manner if it is desired, otherwise it may be of any design which will lend support to the rack.

Each of the hollow shelves 21 through 25 is supported in vertically spaced, parallel relation by a plurality of tubular fittings, certain of which project from the posts 13 to 15, and others of which project from ducts 32–35. The same tubular fittings, as noted hereinafter, are utilized to convey air to and from the hollow shelves.

For example, secured to the confronting surfaces of the posts 12 and 13 in vertically spaced, laterally registering relation, are a plurality of rectangular, tubular fittings 81 (FIGS. 5 and 6). Each fitting 81 on post 13 is welded at its inner end to the face of the post 13 which faces the post 12. Moreover the fittings 81 on post 13 are equispaced from one another a distance equal to the space between adjacent shelves 21-25. Each fitting 81 on the post 13 projects into the space formed between the two metal sheets 72 and 73 of a respective shelf, and in this respect forms a rigid support for the associated shelf at one corner thereof. Likewise the fittings 81, which are secured to the confronting surface of the post 12, are welded at their inner ends to the post 12, and project at their outer ends into the space between the sheets 72, 73 of a respective shelf 21, 22, 23, 24 or 25, and in opposed registry with the associated fitting 81 on post 13.

In a like manner, another set of rectangular, tubular fittings 82, which are similar in configuration to the fittings 81, are welded at their inner ends to the confronting surfaces on the rear posts 14 and 15 of the rack 10, and project at their outer ends into the interiors of the shelves 21 through 25, and in registering relation to each other as in the case of the fittings 81. As a consequence, each shelf 21 through 25 is supported at the corners of its forward edge by a pair of fittings 81, and at the corners of its rear edge by a pair of the fittings 82.

The fittings 81 and 82 are also designed to assist in supplying fresh air from the posts 13 and 15 to the spaces between the two lowermost shelves 24 and 25. For example, the fittings 81, which projects from post 13 into the space between the sheets 72 and 73 of shelf 24, has its bore in registry with a circular opening 13' (FIG. 6), which is formed in the wall of the post to which this particular fitting is welded. Likewise, the next-lower fitting 81 on the post 13, which projects into shelf 25, also registers with another opening 13' (not illustrated) in post 13, so that air from the post 13 can be supplied through the openings 13' and the associated fittings 81 into the interiors of the shelves 24 and 25. Similarly, the fittings 82 which project into the interiors of the shelves 24 and 25, register also with openings 15' (only one of which is illustrated in FIG. 6) in the post 15, so that air can be fed from the post 15 into each of the shelves 24 and 25.

Air from the posts 13 and 15 is also fed to the interiors of shelves 24 and 25 through two additional sets of rectangular, tubular fittings 83 and 84, which extend at right angles to fittings 81 and 82, and which are welded at their inner ends over openings 85 and 86, respectively, that are formed in the confronting walls of the posts 13 and 15, respectively. The fittings 84 and 85 for a respective shelf 24 or 25 have their axial center lines disposed in the same horizontal plane as the corresponding shelf fittings 81 and 82; and the opposed sheets 72 and 73 of each shelf 24 or 25 are also folded over, or formed around, the fittings 83 and 84 in a manner similar to that in which they are formed around the fittings 81 and 82. Consequently the fittings 83 and 84 also help to support the shelves 24 and 25 in their respective horizontal positions on rack 10.

The three uppermost shelves 21, 22, and 23 do not receive fresh air from the posts 13 and 15, but from the additional or supplemental ducts 33 and 35. The lower, terminal ends of these ducts 33 and 35 are blocked or closed, as for example by a portion 73' (FIG. 6) of the lower, metal sheet 73, which forms part of the shelf 23. It should be noted also that the fittings 81 and 82, which project from the posts 13 and 15 at the levels of the shelves 23, 22 and 21, are not in communication with the interior of the posts 13 and 15, so that any fresh or filtered air that is fed downwardly through the posts 13 and 15 is not discharged until it reaches one of the openings 13' or 15', respectively, which register with the two lowermost shelves 24 and 25. On the other hand, air entering the upper end of supplemental duct 33 is fed to the interiors of the shelves 21, 22 and 23, through three, vertically-spaced, circular openings 91 (FIGS. 5 and 6), which are formed in one wall of the duct 33 to register with the interiors of shelves 21, 22, and 23, respectively. (Only two such openings are illustrated in FIG. 6.) Likewise, portions of the air entering the supplemental duct 35 are fed through circular openings 92 that are formed in one wall of this duct in communication with the interiors of shelves 21, 22 and 23, respectively.

Additional air is supplied ot these uppermost shelves by two sets of rectangular, tubular fittings 94 and 95 (FIGS. 5 and 6), which are welded at their inner ends to the confronting surfaces of the supplemental ducts 33 and 35 at vertically spaced points therealong to project into the interiors of the shelves 21, 22 and 23 at right angles to fittings 81. Each fitting 94 registers at its inner end with a circular opening 96, which is formed in the wall of the duct 33 to connect the interiors of shelves 21-23 to the air supply in duct 35. It will be understood that similar such circular openings (not illustrated) are formed at vertically spaced points along the confronting wall of the duct 35, and in communication with the bores in the fittings 95 so that air is also supplied through these fittings to shelves 21-23. As in the case of the tubular fittings 81 and 83, the fittings 94 and 95 also serve to support their associated shelves 21, 22 and 23 against vertical movement on the stand 10.

Each of the shelves 21 to 25 is divided into three, longitudinally extending chambers or compartments by means of a pair of elongate, spring steel strips or dividers 101 (FIGS. 5 and 6), which are mounted between the two sheets 72, 73 of each shelf to extend between the ends of the shelf in spaced, parallel relation to each other. The two dividers 101 in each shelf register, respectively, with a pair of spaced, vertical planes, which extend through the center lines of two rows of cages 68 which are supported beneath each shelf. Hereinafter the chamber formed between the two dividers 101 of a given shelf will be referred to as the central, or exhaust chamber for the shelf, while the two outermost chambers or compartments which lie outwardly of the dividers 101 will be referred to as the air supply chambers for the shelf.

Each of the lower sheets 73, which form the bottoms of shelves 21 through 25, has therein a plurality of small circular openings or apertures 102, certain of which communicate with the air supply chambers of a respective shelf, and the others of which communicate with the exhaust chamber of the shelf. (See for example FIGS. 5 and 6) Consequently, air which is admitted form the members 13, 15, 33 and 35 to the two air supply chambers of a respective shelf, passes downwardly and into the interiors of the cages 68, which are supported therebeneath, and then passes upwardly out of the cages and through other openings 102 in the sheets 73 into the associated exhaust chambers formed in the shelves between the dividers 101. (See the arrows in FIG. 6).

In order to exhaust the air from the shelf exhaust chambers, a plurality of elongate, rectangular, tubular exhaust ducts 104 and 105 (FIGS. 1 and 6) are welded at one end over registering openings in the confronting surfaces of the ducts 32 and 34, and project at their opposite ends into the spaces in the three uppermost shelves 21, 22 and 23, and beyond the dividers 101, so that the inner ends of each pair of ducts 104, 105 communicate with the exhaust chamber of a respective shelf. As a consequence, any foul air which has circulated through the cages 68 and back into the associated exhaust chamber of a respective shelf 21, 22 or 23, will travel the length of the shelf and enter the inner ends of the associated exhaust members 104 and 105, opposite ends of which members are in communication with the interiors of the vertical exhaust ducts 32 and 34. Consequently, this air is exhausted through the ducts 32 and 34 to the exhaust plenum 41 as described above.

The two lowermost shelves 24 and 25 also have their respective exhaust chambers between their dividers 101 placed in communication with rectangular, tubular fittings or exhaust members 104' and 105' (FIG. 6), the inner ends of which communicate with the exhaust chambers, and the outer or opposite ends of which are welded to the confronting surfaces of the posts 12 and 14, and in communication with the interiors thereof, so that exhaust air from the shelves 24 and 25 is returned through the posts 12 and 14 to the exhaust plenum 41.

From the foregoing, it will be apparent that each of the shelves 21 through 25 can be rather inexpensively manufactured from relatively thin sheetmetal to form generally rectangular, hollow shelves, the marginal edges of which are secured together simply by crimping, or the like. Structural rigidity is afforded through the use of the tubular fittings 81, 82, 83, 84, 94, 95, 104 and 105, 104' and 105', which are welded at their inner ends to the associated posts or duct members, and which project at their opposite ends into the interiors of the associated shelves to assist in supporting the shelves against vertical movement. This structure also has the advantage that the tubular members can be utilized for conveying, continuously, a stream of fresh air from the fresh air plenum 61 to the interiors of the numerous shelves, after which the air is caused to pass downwardly through the cages which are suspended therefrom, and then upwardly into the associated exhaust chambers for return through the filter system which is mounted in housing 51 on top of the rack 10. By carefully selecting the sizes of the apertures through which the air passes as it is supplied to the various shelves, and from there to the filtering unit, it is possible to provide a near steady-flow condition, so that no one cage 68, regardless of where it is mounted on the stand 10, will receive any more or less air than any other cage. By using the brackets 65 in combination with the type of cage 68 which has a flange 69 around its upper end, it is possible to provide a relatively snug seal between the upper, open end of each cage and the associated shelf bottom, so that fresh air supplied to a cage will not be exhausted to the atmosphere through leakage in or around the cage. Each cage is therefore isolated from the other to prevent any cross contamination. In addition, a balanced or controlled ratio of intake to exhaust air can be readily effected through the use of the air dampers associated with the filter system that is located on the top of stand 10.

Not only does this system enable ventilation of each cage without requiring ventilation of the associated room in which the rack 10 is located, but also the rack provides a physical barrier between cages or racks within a given room, and prevents transfer of droplets, particles or gases from cage to cage or between staff and animals. The rack also makes maximum utilization of the floor space, and requires a minimum of weight and bulk, so that the rack itself can be moved about on its casters very readily. The associated filtering system utilizes conventional components which can be readily cleaned or replaced, if necessary; and the rack itself is very compatible for supporting either special or conventional box-shaped housings, door opening and other animal facilities of known utility.

While brackets 65 have been described as being straight members extending between opposite sides of the rack, each could be formed in a generally "U" shaped configuration so that each cage would be supported in its own receptable and could not be withdrawn from either side of the rack. Also in such case each side of each cage will be engaged along three of its four edges, thus reducing even further any air leakage which might occur between each cage and its associated mounting brackets 65.

Also, while it has been suggested that sheets 72 and 73 of each shelf be joined by crimping, it will be readily apparent that the two sheets of each shelf could be welded together, or if material other than metal is employed, could be glued together to form therein the sealed spaces for conveying air to and from the cages.

It will be equally apparent, that in the use of certain embodiments, as where the weight of the filled cages is not excessive, it will be possible to eliminate the supporting fittings 81, 82, 93, 94, 104, 105, and instead weld or otherwise secure the corners of the several shelves 21–26 directly to the tubular legs 12–15. Moreover, in certain cases, these legs can be made of larger cross section diameters, thereby increasing the cross-sectional areas of their bores, and thus obviating the need to employ the supplemental duct members 32–35 on the upper ends of legs 12–15.

While it has been suggested that the opening controlled by damper 47 can be used to admit fresh air to supplement the air recirculated through blower 42, it will be appreciated that this opening could be connected to a central air supply, which would then supplement the exhaust from blower 42. Also, if desired, the plenum 45 and housing 52 could be separated into two, longitudinally-extending sections, one of which would convey recirculated air through the housing 52 to the above-noted central air supply, and the other of which would communicate thorugh the opening controlled by damper 47 with the central air supply to receive fresh, conditioned air therefrom, and to deliver this air through the filters in housing 52 to blower 57.

Moreover, although this invention has been described and illustrated in detail in connection with only certain embodiments thereof, it will be understood that it is capable of still further modification, and that this application is intended to cover any such modifications as may fall within the scope of one skilled in the art or the appended claims.

Having thus described my invention, what I claim is:

1. A storage rack for animal cages, comprising a frame including a plurality of spaced, hollow, upstanding legs, a plurality of generally flat, hollow shelves supported on said legs in vertically spaced relation, each of said shelves having its interior divided into at least two separate chambers,

*a plurality of additional ducts alongside said legs,* an air filtration system connected to said rack and having an outlet connected through certain of said hollow legs *and said additional ducts,* with the interior of one chamber in each of said shelves, and having an inlet connected through others of said hollow legs *and said additioanl ducts* with the interior of the other chamber in each of said shelves, *shelves toward an upper end of said frame being connected to said filtration system by certain of said legs and said additional ducts, and others of said shelves adjacent the lower end of said frame being connected to said filtration system by said legs* and means for releasably supporting a plurality of animal cages on each of said shelves, each of said cages having only one open end, and said open end of each cage communicating through a first plurality of spaced openings in the associated shelf with said one chamber therein, and communicating through a second plurality of spaced openings in the associated shelf with said other chamber therein, whereby filtered air from said [inlet] *outlet* is circulated successively through said one chambers, said cages and said other chambers back to the inlet of said system.

2. A storage rack as defined in claim 1, wherein said first and second pluralities of openings are in the undersides of said shelves, each of said cages has a lateral flange around its open end, and said supporting means comprises a plurality of pairs of spaced brackets secured to the underside of each of said shelves, each pair of said brackets being releasably engageable with the flange on the open end of the cage releasably to support the open end of the cage against the underside of a shelf with the opening in the cage communicating with certain of both said first and second pluralities of openings in the last-named shelf.

3. A storage rack as defined in claim 1, wherein each of said shelves is made from a sheet metal material, and is supported on said legs by a plurality of rigid, tubular elements, each of which is fixed at one end to one of said legs, and projects at its opposite end into the interior of the associated shelf.

4. A storage rack as defined in claim 3, wherein certain of said tubular elements open at one end on said one chambers in said shelves and at their opposite ends on the interiors of said certain legs thereby to place said one chambers in communication with the outlet of said filtration system, and other of said tubular elements open at one end on said other chambers in said shelves and at their opposite ends on the interiors of said other legs thereby to place said other chambers in communication with the inlet to said filtration system.

[5. A storage rack as defined in claim 1, wherein there are two sets of said upstanding legs, and certain of said shelves adjacent the upper end of said frame are connected to said filtration system by one set of said legs, and others of said shelves adjacent the lower end of said frame are connected to said system by the other set of legs.]

6. A storage rack as defined in claim [5] *1*, wherein said supporting means includes means for supporting said cages in two, spaced, parallel rows from the underside of each shelf, with the cages in each row being insertable into, or withdrawable from, either side of said frame, and said first and second sets of openings being formed in the undersides of said shelves so that the open end of each cage supported from a shelf will register with certain each of said first and second pluralities of openings in the associated shelf.

7. A storage rack as defined in claim 1, wherein said filtration system comprises a a plurality of filter units mounted in a filter plenum on said frame, and at least one fan mounted on said frame in communication with said filter units and said shelves, respectively, and operative, when operating, to circulate exhaust air from said other chambers and successively through said filter units to said one chambers.

8. A storage rack as defined in claim 7, wherein a second fan is mounted on said frame in spaced relation to the first-named fan, an exhaust plenum is mounted on said frame in communication with said other chambers and the inlet to said second fan, a filtered air plenum is mounted on said frame in communication with the outlet of said first-named fan and with said one chambers, and said filter plenum is connected at one end to the outlet of said second fan and to the inlet of said first-named fan, whereby air from said exhaust plenum passes successively through said filter units to said first-named fan, when said fans are operating.

9. A storage rack as defined in claim 8, including means for selectively admitting fresh, ambient air to said filter plenum between said second fan and said filter units.

10. A storage rack for animal cages, comprising:

a frame having thereon a plurality of generally flat, hollow, vertically-spaced shelves, a plurality of animal cages releasably suspended from the undersides of said shelves, each of said cages being closed except at its upper end, having its upper, *and* open end disposed in closely-spaced relation to the underside of the shelf from which it is suspended, whereby *a relatively snug seal is formed between* the upper end of each cage [is substantially closed by the confronting underside of a] *and the bottom of the associated* shelf, each of [siad] *said* shelves having a plurality of sets of spaced openings in the underside thereof, and each of said cages having its upper, open end registering with a set of said openings in a shelf when suspended therefrom,

*means in each shelf operatively separating certain of said openings in each of said sets from the remaining openings in the set,* means for supplying fresh air through said shelves to [at least] *said* certain [of said] openings in each set thereof for delivery *through said certain openings* to [a respective] *said* [cage] *cages*, and means [connecting the] *including an exhaust fan connected to said* remaining openings of each set thereof [to an exhaust fan] *and* operable to withdraw air from each cage supported on said frame, *filter means interposed between said exhaust fan and said supplying means and operative to filter and return to said supplying means at least part of the air withdrawn from said cages,* whereby each cage on said frame is air-conditioned, and at the same time has its interior physically isolated from the interiors of the other cages on the frame, and from the ambient air surrounding said frame[.],

*said frame including a plurality of spaced, hollow legs and additional ducts operatively connected to said shelves to support the latter in a vertically-spaced relation,*

*a first plurality of rigid, tubular elements, fixed at one end to certain of said legs and said additional ducts and projecting at their opposite ends into said shelves adjacent one end of said frame,*

*said first plurality of elements communicating at said one ends thereof through said certain legs and said additional ducts with said fresh air supply means, and at their opposite ends with said certain openings in said shelves,*

*said second plurality of elements communicating at said one ends thereof through the other of said legs and said additional ducts with said fan, and at their opposite ends with said remaining openings in said shelves,*

*said certain legs being a set of hollow legs located adjacent said one end of said frame and said additional ducts being located adjacent said hollow legs, one of said sets of legs and said additional ducts being connected by certain of said first plurality of elements to certain only of said shelves, and the other of said sets of legs and ducts being connected by the others of said first plurality of elements to the remaining shelves, a lowest shelf being connected to the legs.*

11. A storage rack as defined in claim 10, including a plurality of elongate cage supporting members secured to the undersides of each of said shelves in equi-spaced, parallel relation, *and with the space between each adjacent pair of said members registering with one of said sets of openings*, each of said members being of a generally inverted T-shape configuration in cross section, and having on opposite sides thereof longitudinally extending flanges disposed in spaced relation to the underside of the associated shelf, and each of said cages having a lateral flange around its open end slidable between *an adjacent* pair of said members to have the flange on the cage supported between the underside of a shelf and the confronting side of flanges on said pair of members.

[12. A storage rack as defined in claim 10, wherein said frame includes a plurality of spaced, hollow legs operatively connected to said shelves to support the latter in vertically-spaced relation, a first plurality of rigid, tubular elements are fixed at one end to certain of said legs and project at their opposite ends into said shelves adjacent one end of said frame, a second plurality of rigid, tubular elements are fixed at one end to the other of said legs and project into said shelves adjacent the opposite end of said frame, said first plurality of elements communicate at said one ends thereof through said certain legs with said fresh air supply means, and at their opposite ends with said certain openings in said shelves, and said second plurality of elements communicate at said one ends thereof through said other legs with said fan, and at their opposite ends with said remaining openings in said shelves.]

[13. A storage rack as defined in claim 12, wherein said certain legs include two sets of hollow legs located adjacent said one end of said frame, one of said sets of legs being connected by certain of said first plurality of elements to certain only of said shelves, and the other of said sets of legs being connected by the others of said first plurality of elements to the remaining shelves.]

14. A storage rack as defined in claim [12] *10*, wherein said exhaust fan is mounted on said frame with its inlet side connected to said other legs, said fresh air supplying means comprises a second fan mounted on said frame with its outlet side connected to said certain legs, and *said filter means comprises* a filter plenum containing a plurality of air filters [is] *and* interposed between the outlet of said exhaust fan and the inlet of said second fan to convey air from said exhaust fan and through said filters to the inlet of said second fan, whereby freshly filtered air is conveyed to said certain legs.

*15. A storage rack as defined in claim 10, including damper means connected to said filter means and operable selectively to admit fresh air to said filter means to supplement said part of the air that is filtered and returned to said supplying means.*

*16. A storage rack as defined in claim 10, wherein said separating means comprises means dividing the interior of each of said shelves into at least two chambers, one of which communicates with said certain openings in the associated shelf, and the other of which communicates with said other openings in the associated shelf, and said frame including a plurality of tubular legs secured to and supporting said shelves in spaced relation, certain of said legs being operative to convey fresh air from said supplying means to said one chambers, and others of said legs being operative to convey exhaust air from said other chambers to said exhaust fan.*

*17. A storage rack as defined in claim 10, wherein said fresh air supplying means comprises a fresh air plenum on said rack connected at one side to the output of said filter means to receive filtered air therefrom, and connects at its opposite side to said certain openings in said shelves to supply filtered air thereto, an exhaust plenum on said rack is connected at one side to the input of said exhaust fan and at its opposite side to said other opening in said shelves to draw exhaust air therefrom for delivery to said exhaust fan, and said filter means is interposed between the output of said fan and the input to said fresh air plenum, whereby air circulates in a closed system through said cages.*

*18. A storage rack as defined in claim 17, including adjustable means interposed between said plenums and operable to control the rate of flow of air through said cages.*

*19. A storage rack as defined in claim 17, including adjustable means interposed between said plenums and operable selectively to supplement, from a source exterior to said closed system, the filtered air supplied from said filter means to said fresh air plenum.*

* * * * *